(12) United States Patent
Park et al.

(10) Patent No.: US 11,084,135 B2
(45) Date of Patent: Aug. 10, 2021

(54) CLAMPING MECHANISM AND MACHINING CENTER HAVING THE SAME

(71) Applicants: Hyundai Motor Company, Seoul (KR); KIA Motors Corporation, Seoul (KR)

(72) Inventors: Kyoung Min Park, Ulsan (KR); Kwang Jin Kim, Ulsan (KR); Dong Sich Lim, Ulsan (KR); Jong Chan Jang, Ulsan (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 298 days.

(21) Appl. No.: 16/189,150

(22) Filed: Nov. 13, 2018

(65) Prior Publication Data

US 2019/0381615 A1 Dec. 19, 2019

(30) Foreign Application Priority Data

Jun. 14, 2018 (KR) .................. 10-2018-0068061

(51) Int. Cl.
| | |
|---|---|
| *B23Q 3/06* | (2006.01) |
| *B23Q 3/155* | (2006.01) |
| *B25B 1/02* | (2006.01) |
| *B25B 1/10* | (2006.01) |
| *B25B 1/18* | (2006.01) |
| *B23Q 39/02* | (2006.01) |

(52) U.S. Cl.
CPC ........... *B23Q 3/06* (2013.01); *B23Q 3/15553* (2013.01); *B23Q 39/027* (2013.01); *B25B 1/02* (2013.01); *B25B 1/103* (2013.01); *B25B 1/18* (2013.01); *B23Q 2003/15586* (2013.01)

(58) Field of Classification Search
CPC ...... Y10T 483/1738; B23Q 2003/1558; B23Q 2003/15586; B23Q 3/06; B23Q 3/15553; B23Q 3/157; B23Q 39/022; B23Q 39/027; B25B 1/02; B25B 1/103; B25B 1/18
USPC ........ 29/39; 408/35; 483/32, 56, 59; 82/121, 82/159
See application file for complete search history.

(56) References Cited

U.S. PATENT DOCUMENTS

| | | | | |
|---|---|---|---|---|
| 3,601,886 | A * | 8/1971 | Gohren | B23Q 3/15506 483/5 |
| 5,372,568 | A * | 12/1994 | Matsuoka | B23B 31/263 483/56 |
| 5,383,261 | A * | 1/1995 | Yamamoto | B23Q 16/065 29/39 |
| 5,947,878 | A * | 9/1999 | Hwang | B23Q 3/1554 483/44 |

FOREIGN PATENT DOCUMENTS

| | | | | | |
|---|---|---|---|---|---|
| JP | H079221 | A | * | 1/1995 | ............. B23Q 16/06 |
| JP | H07106523 | B2 | * | 11/1995 | ........... B23Q 3/1554 |
| JP | 3395855 | B2 | * | 4/2003 | ............. B23B 39/16 |

* cited by examiner

*Primary Examiner* — Joseph J Hail
*Assistant Examiner* — Arman Milanian
(74) *Attorney, Agent, or Firm* — Brinks Gilson & Lione

(57) ABSTRACT

There is provided a clamping mechanism, including: a housing which is movable to clamp or unclamp an object having clamping blocks; a clamping plate disposed in front of the housing; and a first elastic member applying a clamping force to the clamping plate by movement of the housing, wherein the clamping blocks have receiving grooves in which edges of the clamping plate are received.

15 Claims, 11 Drawing Sheets

CLAMPING MECHANISM AND MACHINING CENTER HAVING THE SAME

CROSS-REFERENCE TO RELATED APPLICATION

This application claims priority to and the benefit of Korean Patent Application No. 10-2018-0068061, filed on Jun. 14, 2018, the entire contents of which are incorporated herein by reference.

FIELD

The present disclosure relates to a clamping mechanism and a machining center having the same.

BACKGROUND

The statements in this section merely provide background information related to the present disclosure and may not constitute prior art.

A machining center may include a machine tool that is a machine for shaping or machining metal or other rigid materials, usually by cutting, boring, grinding, shearing, or the like. Machine tools employ some sort of tool that does the cutting or shaping.

A machining center for a flexible manufacturing system includes a machine tool having a plurality of toolheads individually having tool spindles, a toolhead changer for automatically selecting one of the plurality of toolheads, a hydraulic clamping mechanism for clamping the selected toolhead, and a drive mechanism for driving the tool spindle of the selected toolhead.

The toolhead selected by the toolhead changer may be clamped or unclamped by the hydraulic clamping mechanism. The tool spindle of the toolhead clamped by the hydraulic clamping mechanism may receive power from a drive shaft of the drive mechanism.

A hydraulic clamping mechanism in a conventional machining center is configured to receive or collect hydraulic fluid from a hydraulic fluid supply device to clamp or unclamp the selected toolhead. Thus, it takes time for the hydraulic clamping mechanism to wait for a signal for the supply or collection of the fluid during changing the toolhead, which may delay the entire working time of the machining center, and reduce the operating efficiency of the machining center. In addition, the hydraulic fluid may leak due to the wear of a packing of a hydraulic cylinder so that it may contaminate the surrounding environment. Furthermore, an assembly process after disassembling the hydraulic cylinder in repairing the hydraulic clamping mechanism is complex, which may be excessively time-consuming.

In the conventional machining center, the axis of rotation of the toolhead changer is perpendicular to the axis of a power transmission unit, so that the arrangement of components may be very complicated. In addition, as the total volume increases, the machining center may take up a relatively large installation space.

SUMMARY

An aspect of the present disclosure provides a clamping mechanism capable of clamping or unclamping an object quickly and accurately, thereby reducing the change time of objects and improving the overall work efficiency, and a machining center having the same.

According to an aspect of the present disclosure, a clamping mechanism may include: a housing which is movable to clamp or unclamp an object having clamping blocks; a clamping plate disposed in front of the housing; and a first elastic member applying a clamping force to the clamping plate by movement of the housing, wherein the clamping blocks may have receiving grooves in which edges of the clamping plate are received.

The clamping mechanism may further include a rod guiding the movement of the housing, and the rod may be fastened to the clamping plate.

The rod may include a first rod and a second rod. The first rod may be fastened to a rear surface of the clamping plate, and the second rod may be fastened to a rear end of the first rod. A diameter of the first rod may be greater than a diameter of the second rod.

The first elastic member may be disposed in a longitudinal direction of the second rod, and be a compression spring disposed around the second rod.

A moving distance of the housing may be limited by a first stopper and a second stopper.

The first stopper may limit a forward position of the housing, and the second stopper may limit a reverse position of the housing.

The first stopper may have a first surface limiting a forward position of the housing, and a second surface supporting a front end of the first elastic member.

The second rod may have a retainer supporting a rear end of the first elastic member.

The second stopper may be spaced apart from a rear end of the second rod by a predetermined gap.

The clamping mechanism may further include a backup clamp locking the rod to maintain a state in which the clamping plate clamps the object.

The backup clamp may include a swing arm pivotally connected to the housing, and a pusher applying a locking force to the swing arm by a second elastic member.

The swing arm may move between a locking position in which the rod is locked and an unlocking position in which the rod is unlocked.

The backup clamp may further include a first locking protrusion fixed to a front end of the swing arm and a second locking protrusion fixed to an outer surface of the rod. The locking position may be a position in which the first locking protrusion is engaged to the second locking protrusion, and the unlocking position may be a position in which the first locking protrusion is disengaged from the second locking protrusion.

The backup clamp may further include a cam roller rotatably mounted on a rear end of the swing arm, and a cam guide guiding a movement of the cam roller, and the cam guide may have a first guide surface allowing the swing arm to move to the locking position, and a second guide surface allowing the swing arm to move to the unlocking position.

The pusher may move in a direction perpendicular to an axis of the rod by the second elastic member.

The pusher may contact the swing arm, and push the swing arm by an elastic force of the second elastic member to apply the locking force to the swing arm.

The pusher may have a roller rotatably mounted on an end thereof, and the swing arm may have an anti-wear member fixed to a portion thereof contacting the roller.

According to another aspect of the present disclosure, a machining center may include: a toolhead changer including a turret having a rotating shaft, and a motor rotating the shaft of the turret; a plurality of toolheads disposed along a circumference of the turret; and a machine tool including a clamping mechanism clamping a toolhead selected by the toolhead changer, and a drive mechanism driving a tool spindle of the toolhead clamped by the clamping mechanism, wherein the clamping mechanism may include: a housing which is movable to clamp or unclamp the toolhead selected by the toolhead changer; a clamping plate disposed in front of the housing; and a first elastic member applying a clamping force to the clamping plate by movement of the housing, each toolhead having clamping blocks fixed to a rear surface thereof, and the clamping blocks having receiving grooves in which at least portions of edges of the clamping plate are received.

The clamping mechanism may further include a backup clamp locking the clamping plate to maintain a state in which the clamping plate clamps the toolhead.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
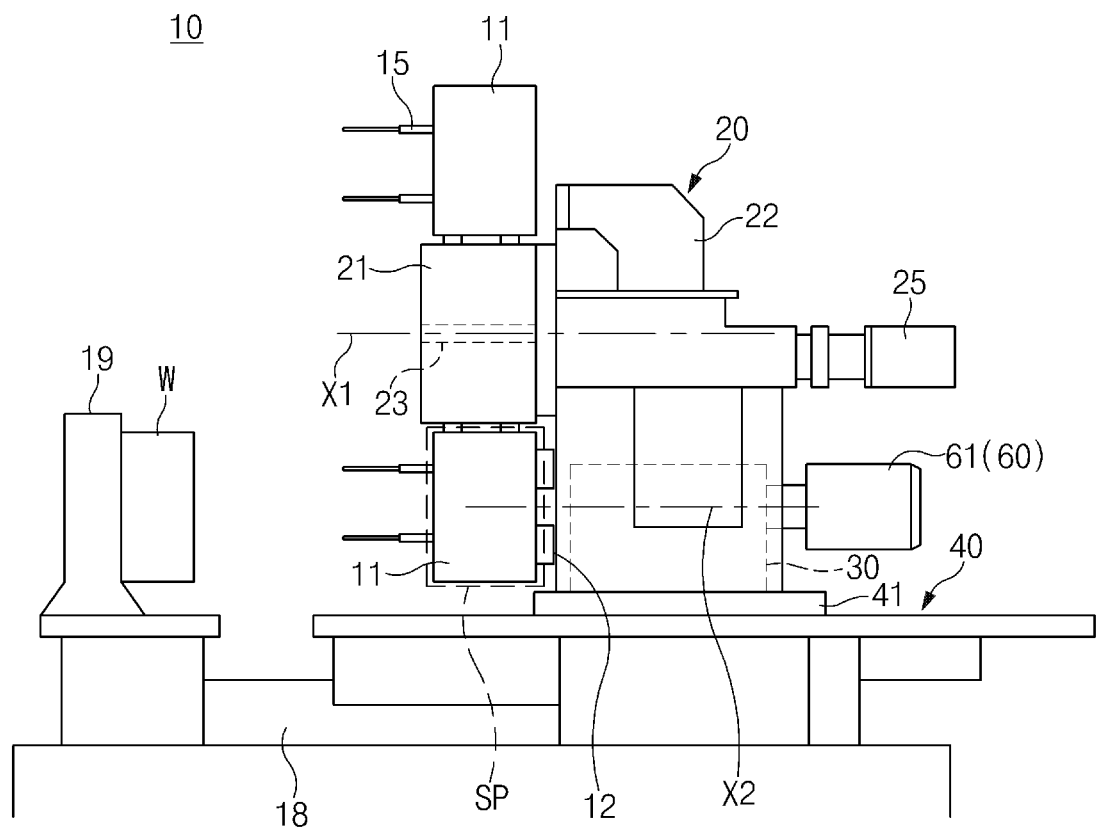
FIG. 1 illustrates a side view of a machining center according to one aspect of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
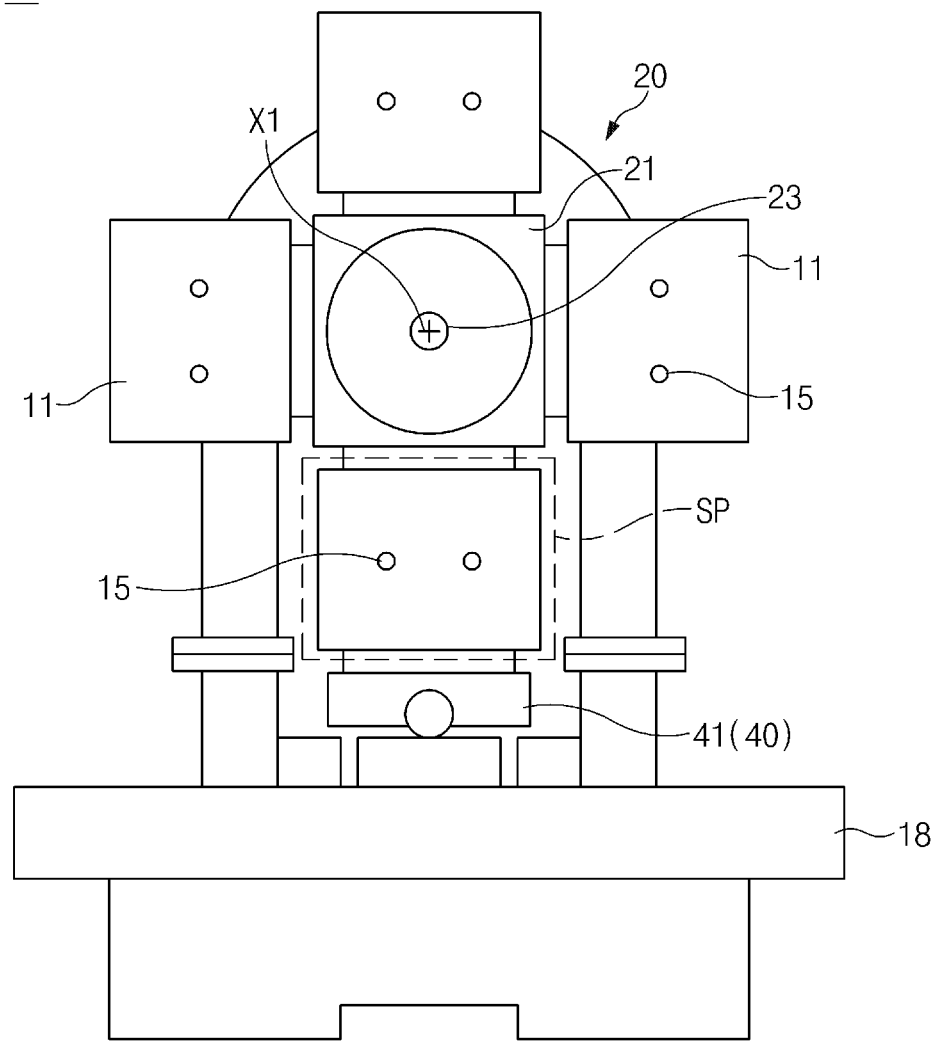
FIG. 2 illustrates a front view of a machining center according to one aspect of the present disclosure.
Figure 3:
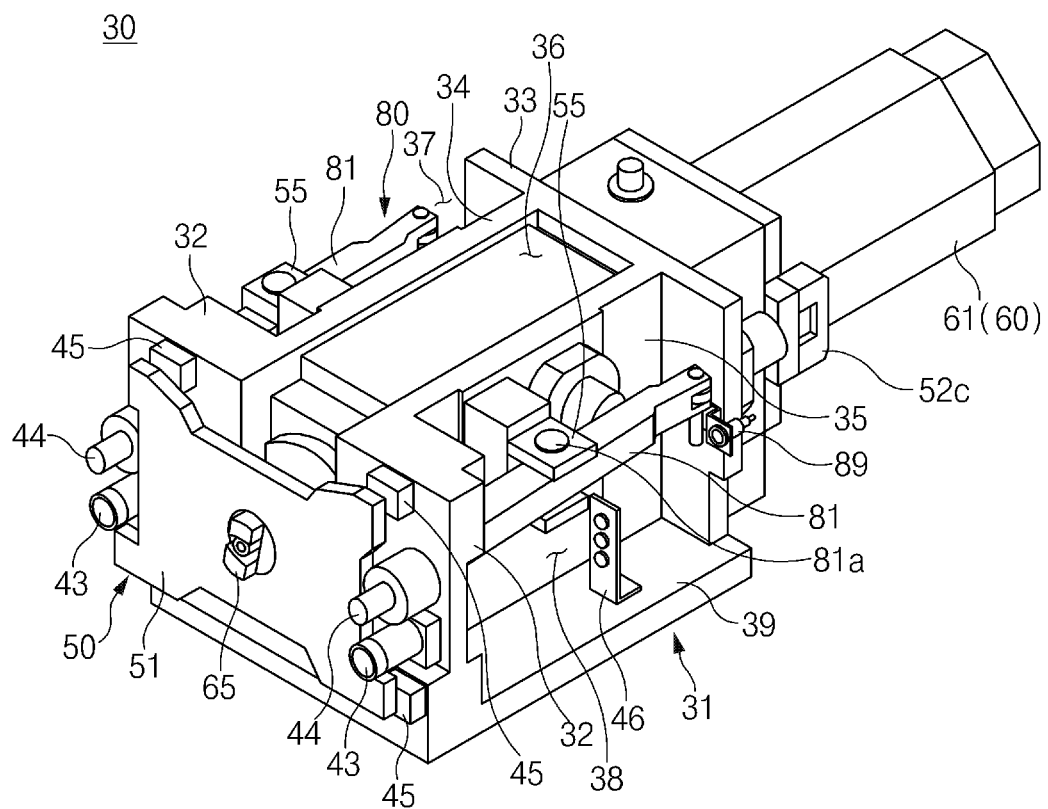
FIG. 3 illustrates a perspective view of a clamping mechanism according to one aspect of the present disclosure.
Figure 4:
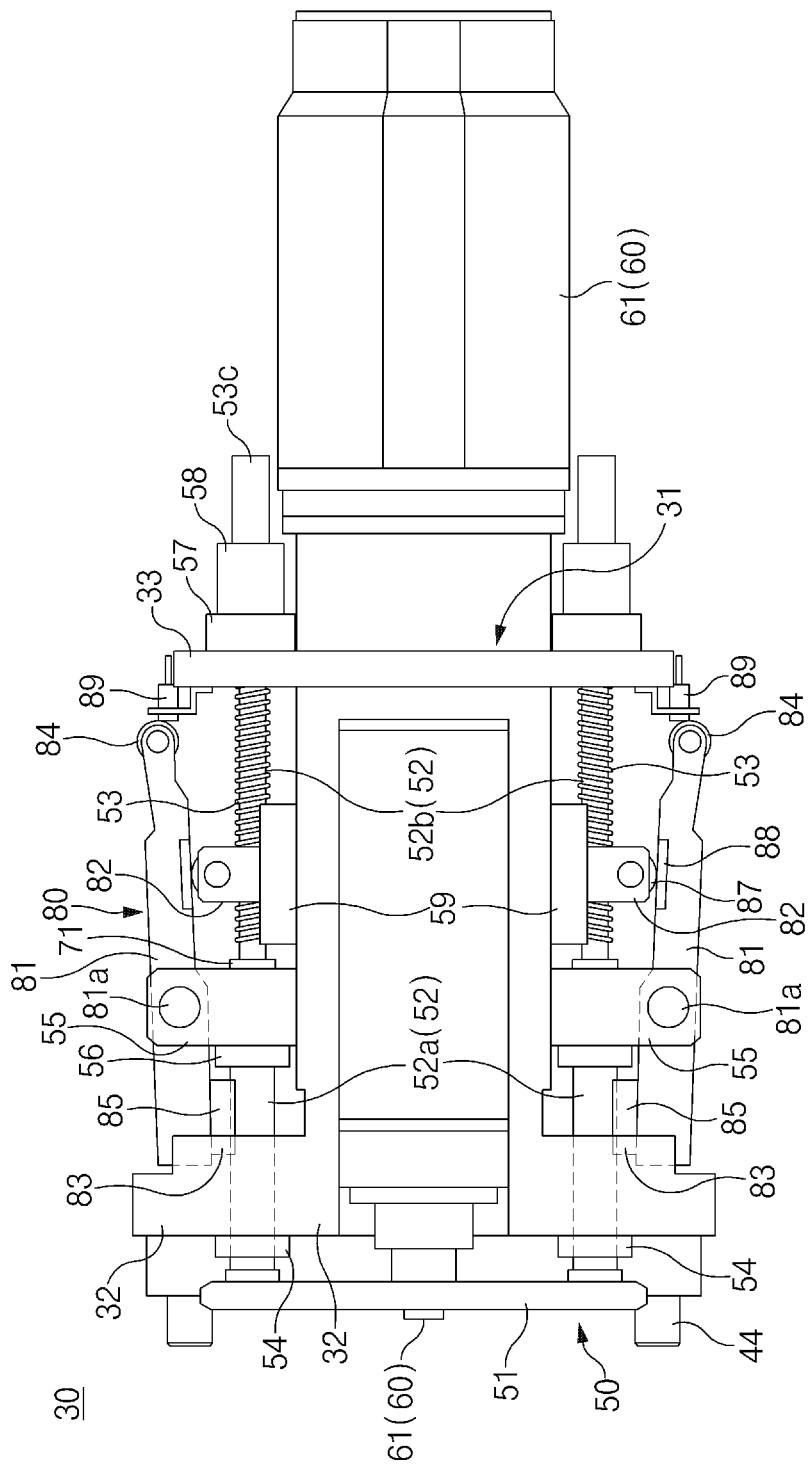
FIG. 4 illustrates a plan view of a clamping mechanism according to one aspect of the present disclosure.

Referring to FIGS. 1 and 2, a machining center 10 according to one form of the present disclosure may include a toolhead changer 20 changing a plurality of toolheads 11.

The toolhead changer 20 may include a rotary turret 21, and a turret base 22 rotatably supporting the turret 21. The turret 21 may have a rotating shaft 23, and the shaft 23 may be rotated by a motor 25 such that the turret 21 may rotate on an axis X1 of the shaft 23. The shaft 23 may be rotatably supported with respect to the turret base 22. The shaft 23 may extend in a horizontal direction, and the axis X1 of the shaft 23 may be a horizontal axis.

The plurality of toolheads 11 may be detachably attached to an outer surface of the turret 21. The plurality of toolheads 11 may be disposed along the circumference of the turret 21. As the turret 21 rotates on the axis X1 of the shaft 23, any one toolhead 11 of the plurality of toolheads 11 may be moved to a selected position (see "SP" in FIG. 1) such that it may be selected to process a workpiece W. Here, as illustrated in FIG. 1, the selected position SP may be a position facing the workpiece W fixed by a fixing jig 18 of a machine base 19, and the toolhead 11 placed in the selected position SP may be clamped or unclamped by a clamping mechanism 50 of a machine tool 30.

Each toolhead 11 may have at least one tool spindle 15, and a tool such as a drill may be detachably mounted on the tool spindle 15.

Figure 5:
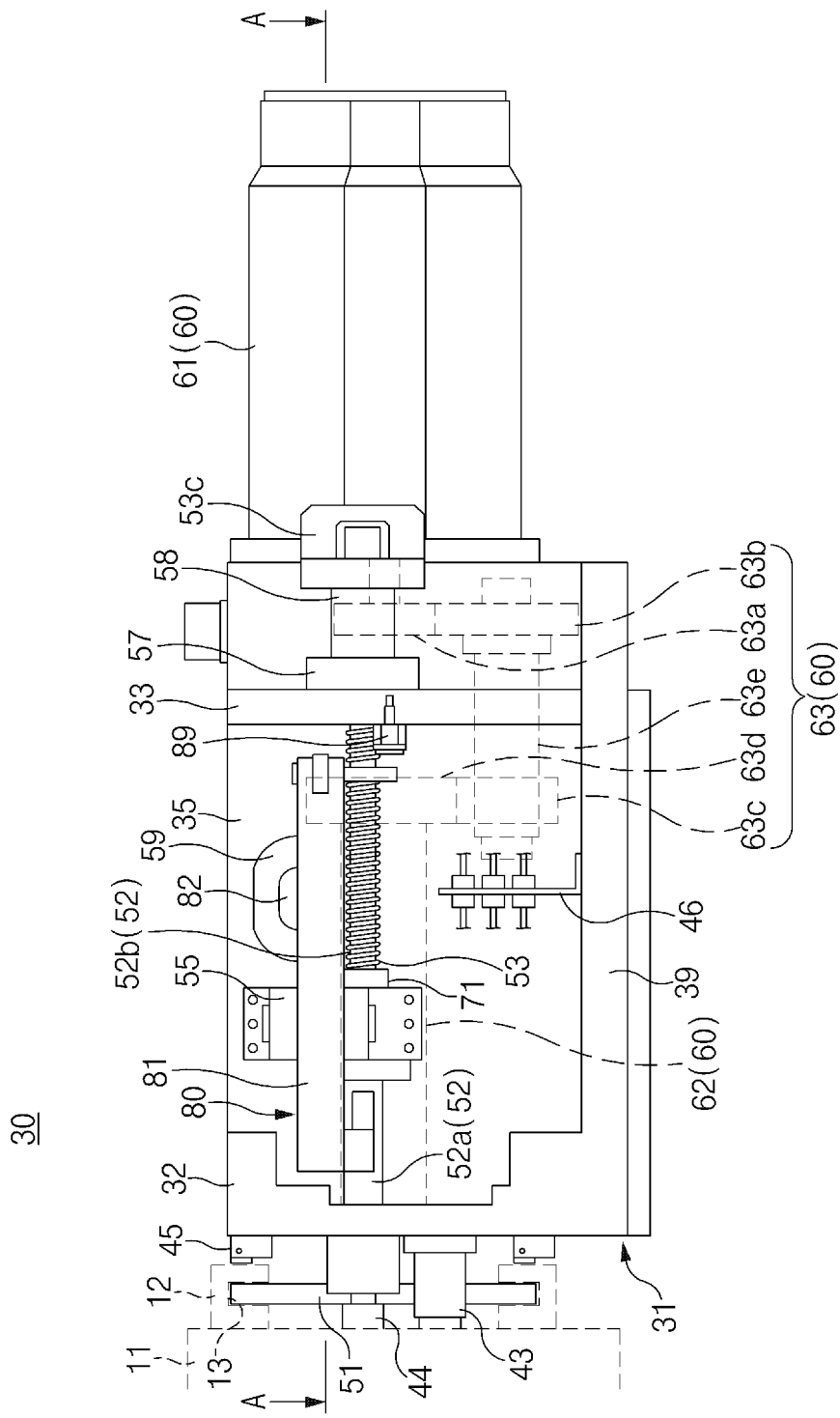
FIG. 5 illustrates a side view of a clamping mechanism according to one aspect of the present disclosure.
Figure 6:
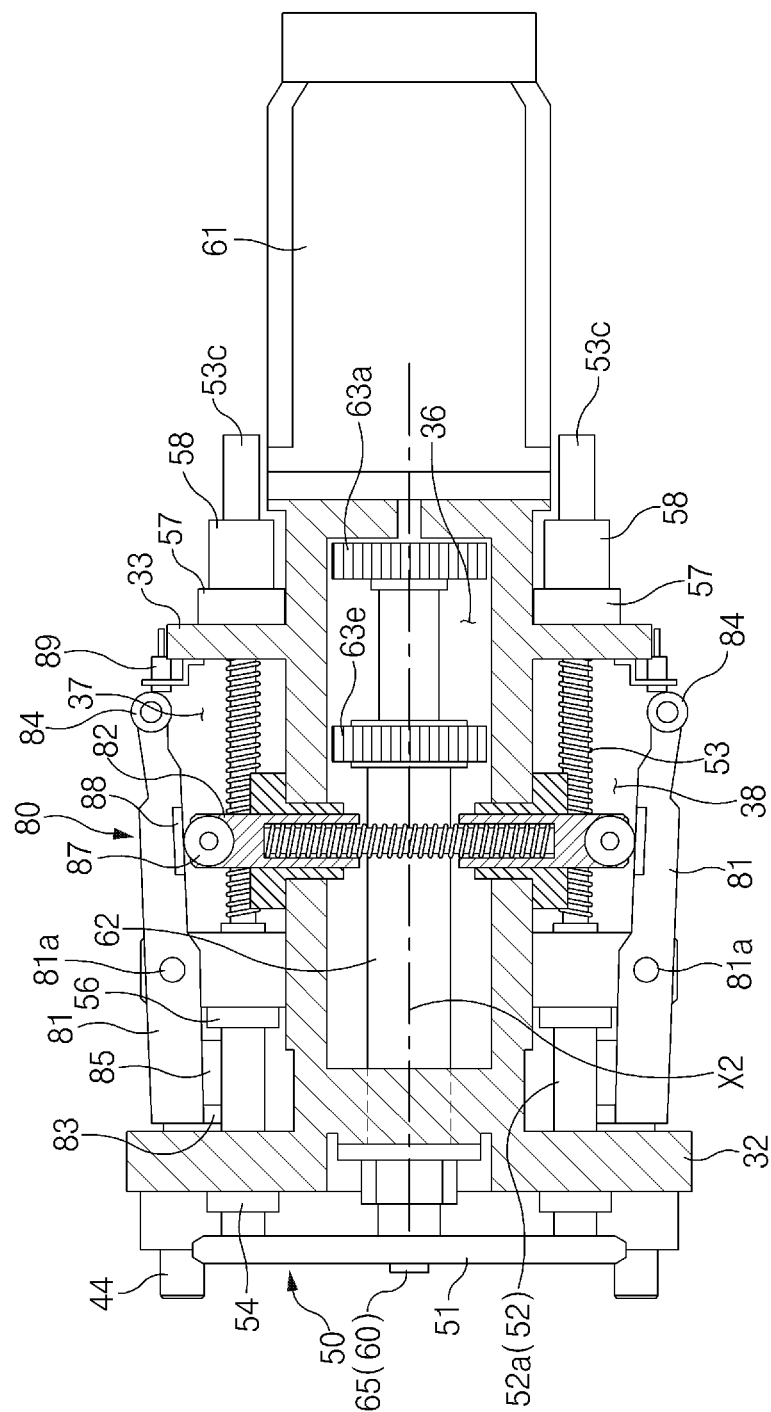
FIG. 6 illustrates a plan cross-sectional view of the clamping mechanism, taken along line A-A in FIG. 5.

As illustrated in FIG. 5, each toolhead 11 may have a plurality of clamping blocks 12, and each clamping block 12 may be fixed to a rear surface of the toolhead 11. The plurality of clamping blocks 12 may be symmetrically arranged on the rear surface of the toolhead 11 in left-right and up-down directions. Each clamping block 12 may have a receiving groove 13 in which at least a portion of the edge of a clamping plate 51 of the clamping mechanism 50 is received.

The machine tool 30 may be disposed below the turret 21, and the machine tool 30 may be moved by a feed unit 40 in a longitudinal direction of the machine base 19.

For example, the feed unit 40 may include a carrier 41 which is movable by a lead screw rotated by a motor, and the carrier 41 may move in the longitudinal direction of the machine base 19.

According to one aspect of the present disclosure, the machine tool 30 may include the clamping mechanism 50 and a drive mechanism 60.

The clamping mechanism 50 may clamp or unclamp the toolhead 11 selected by the toolhead changer 20.

The clamping mechanism 50 may be disposed behind the selected position SP, such that the clamping mechanism 50 may clamp or unclamp the toolhead 11 placed in the selected position SP, that is, the rear surface of the selected toolhead 11. When the toolhead 11 is moved to the selected position SP by the rotation of the turret 21, upper and lower edges of the clamping plate 51 may be individually received in the receiving grooves 13 of the clamping blocks 12 as illustrated in FIG. 5.

According to one aspect of the present disclosure, when the upper and lower edges of the clamping plate 51 are received in the receiving grooves 13 of the clamping blocks 12 of the selected toolhead 11, the clamping mechanism 50 may apply a clamping force that pulls toward the rear of the toolhead 11 to thereby clamp the selected toolhead 11.

The clamping mechanism 50 may include a housing 31, the clamping plate 51 disposed in front of the housing 31, and at least a pair of first elastic members 53 applying the clamping force to the clamping plate 51 by the movement of the housing 31.

The housing 31 may move with respect to an object such as the toolhead 11 to thereby clamp or unclamp the object. The housing 31 may move close to the toolhead 11 to clamp the toolhead 11, or move away from the toolhead 11 to unclamp the toolhead 11.

The housing 31 may be coupled to the carrier 41 of the feed unit 40. As the carrier 41 moves in the longitudinal direction of the machine base 19, the housing 31 may move along with the carrier 41 in the same direction. That is, the housing 31 may be moved forward and backward by the feed unit 40 in the longitudinal direction of the machine base 19.

The housing 31 may include a front wall 32, a rear wall 33 spaced apart from the front wall 32, a pair of sidewalls 34 and 35 arranged in parallel between the front wall 32 and the rear wall 33, and a bottom wall 39. The front wall 32 and the rear wall 33 may be arranged in parallel. The front wall 32, the rear wall 33, and the pair of sidewalls 34 and 35 may be arranged to partition a plurality of spaces 36, 37, and 38. The plurality of spaces 36, 37, and 38 may include a first space 36 positioned in the middle of the housing 31, and a pair of second spaces 37 and 38 positioned at both sides of the first space 36.

The front wall 32 of the housing 31 may have a cutting fluid passage (not shown) and an air passage (not shown) formed therein, and a plurality of cutting fluid connection ports 43, a plurality of air blowers 44 and locating pins 45 may be mounted on a front surface of the front wall 32. A bracket 46 may be mounted on the bottom of the housing 31, and a cutting fluid pipe, an air pipe or the like may be fitted to the bracket 46.

The cutting fluid connection port 43 may communicate with the cutting fluid passage of the front wall 32. When the toolhead 11 is clamped to the machine tool 30 by the clamping mechanism 50, the cutting fluid connection port 43 may be detachably connected to a cutting fluid supply port (not shown) of the toolhead 11, and the cutting fluid may be supplied to the toolhead 11 through the cutting fluid connection port 43.

The air blower 44 may communicate with the air passage of the front wall 32. When the toolhead 11 is clamped to the machine tool 30 by the clamping mechanism 50, the air blower 44 may blow the air to the toolhead 11 to measure an air pressure between the rear surface of the toolhead 11 and the front wall 32 of the housing 31, and thus it may indicate whether or not the toolhead 11 is accurately seated or clamped with respect to the housing 31.

The locating pin 45 may be inserted into a locating groove (not shown) of the toolhead 11 so that the toolhead 11 may be accurately positioned with respect to the housing 31.

The clamping plate 51 may be spaced apart from the front wall 32 of the housing 31 by a predetermined gap, and a pair of rods 52 may be connected to the clamping plate 51. Each rod 52 may be elongated in a longitudinal direction of the housing 31, and each rod 52 may pass through the front wall 32 and the rear wall 33 of the housing 31. The pair of rods 52 may guide the movement of the housing 31. The pair of rods 52 may be positioned in the second spaces 37 and 38 of the housing 31, respectively.

Each rod 52 may have a first rod 52a and a second rod 52b. The first rod 52a may be fastened to a rear surface of the clamping plate 51 and the second rod 52b may be fastened to a rear end of the first rod 52a through fasteners.

A diameter of the first rod 52a may be greater than that of the second rod 52b, and the first rod 52a and the second rod 52b may extend along the same axis. For example, the second rod 52b may be integrated with the rear end of the first rod 52a. Alternatively, the second rod 52b may be detachably connected to the rear end of the first rod 52a.

The first rod 52a may pass through the front wall 32 of the housing 31. A pair of support brackets 55 may be mounted on the side walls 33 and 34 of the housing 31, respectively, and the first rod 52a and the second rod 52b may pass through each support bracket 55. A first guide member 54 may be mounted on the front wall 32 of the housing 31, and a second guide member 56 may be mounted on the front of the support bracket 55. The first rod 52a may pass through the first guide member 54 and the second guide member 56.

The second rod 52b may extend from the rear end of the first rod 52a by a predetermined length, and the second rod 52b may pass through the rear wall 33 of the housing 31. A third guide member 57 may be mounted on the rear wall 33 of the housing 31, and the second rod 52b may pass through the third guide member 57.

A retainer 58 may be fixed to a rear end of the second rod 52b, and the retainer 58 may support a rear end of the first elastic member 53. The retainer 58 may pass through the third guide member 57. A block 52c may be fixed to a rear end of the retainer 58.

A moving distance of the housing 31 may be limited by a first stopper 71 and a second stopper 72.

Figure 7:
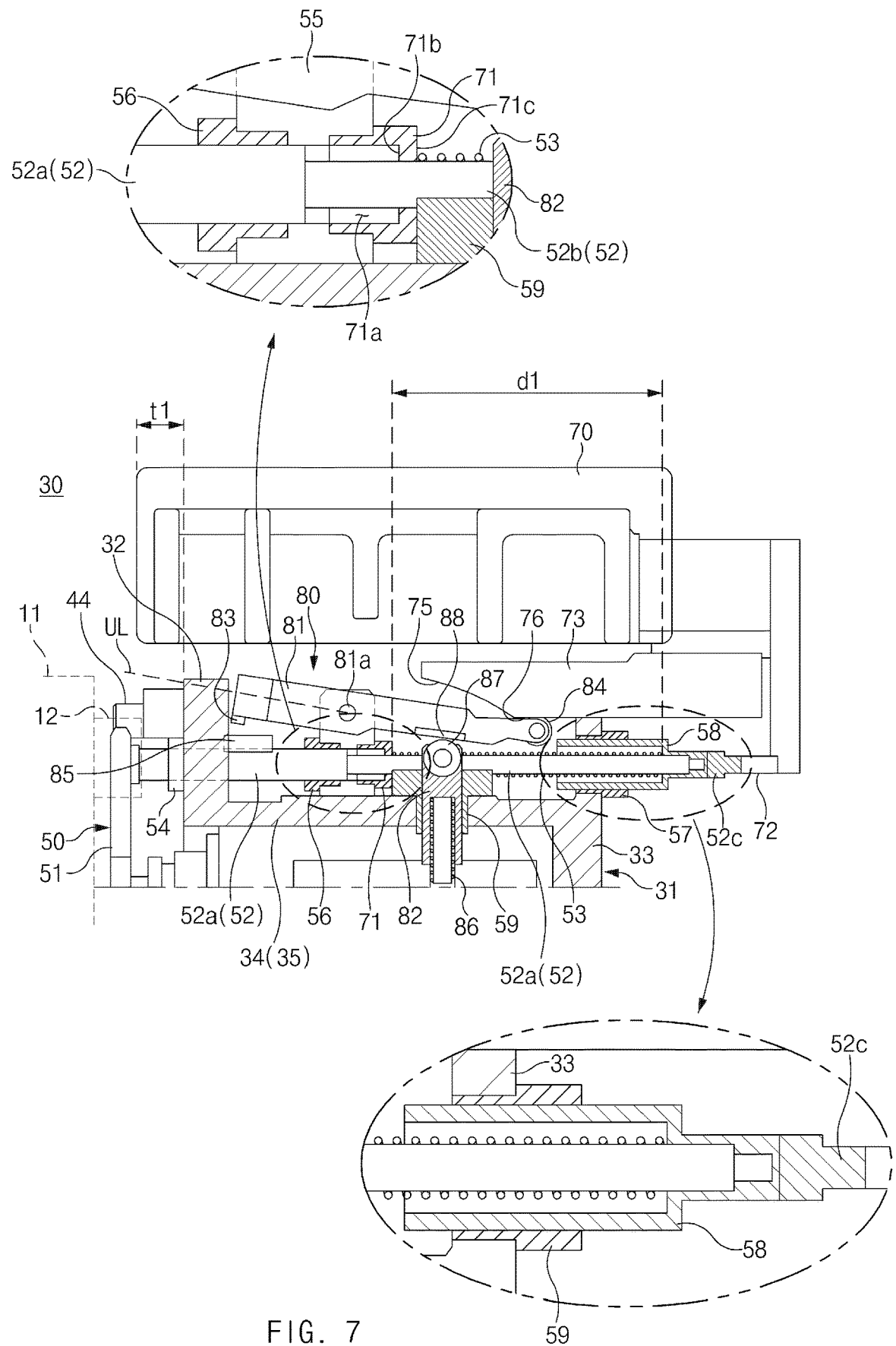
FIG. 7 illustrates a plan cross-sectional view of half of a clamping mechanism according to one aspect of the present disclosure, in a state in which a toolhead is fully unclamped by the clamping mechanism.
Figure 8:
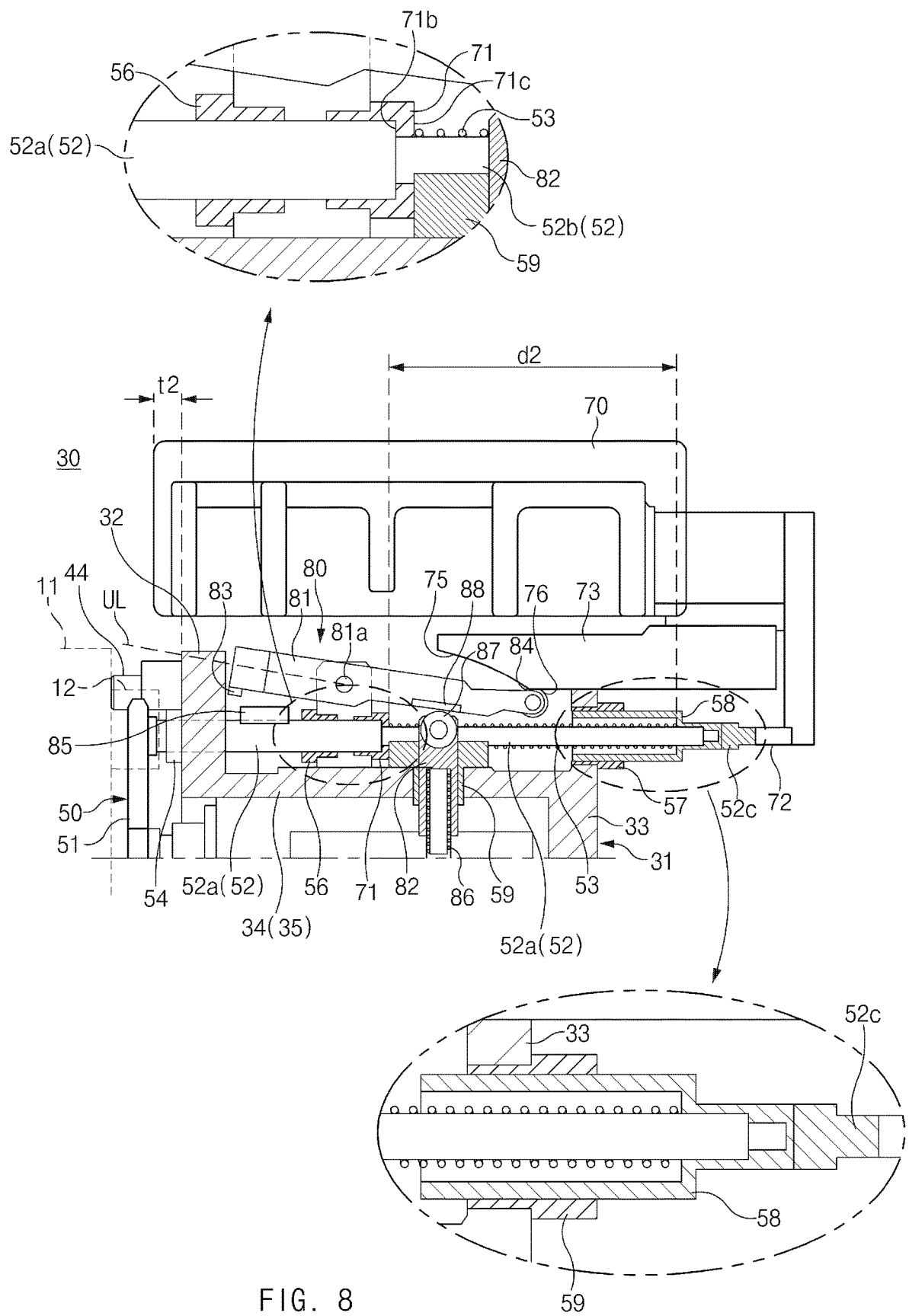
FIG. 8 illustrates a plan cross-sectional view of half of a clamping mechanism according to one aspect of the present disclosure, in a state in which a toolhead is partially unclamped by the clamping mechanism.
Figure 9:
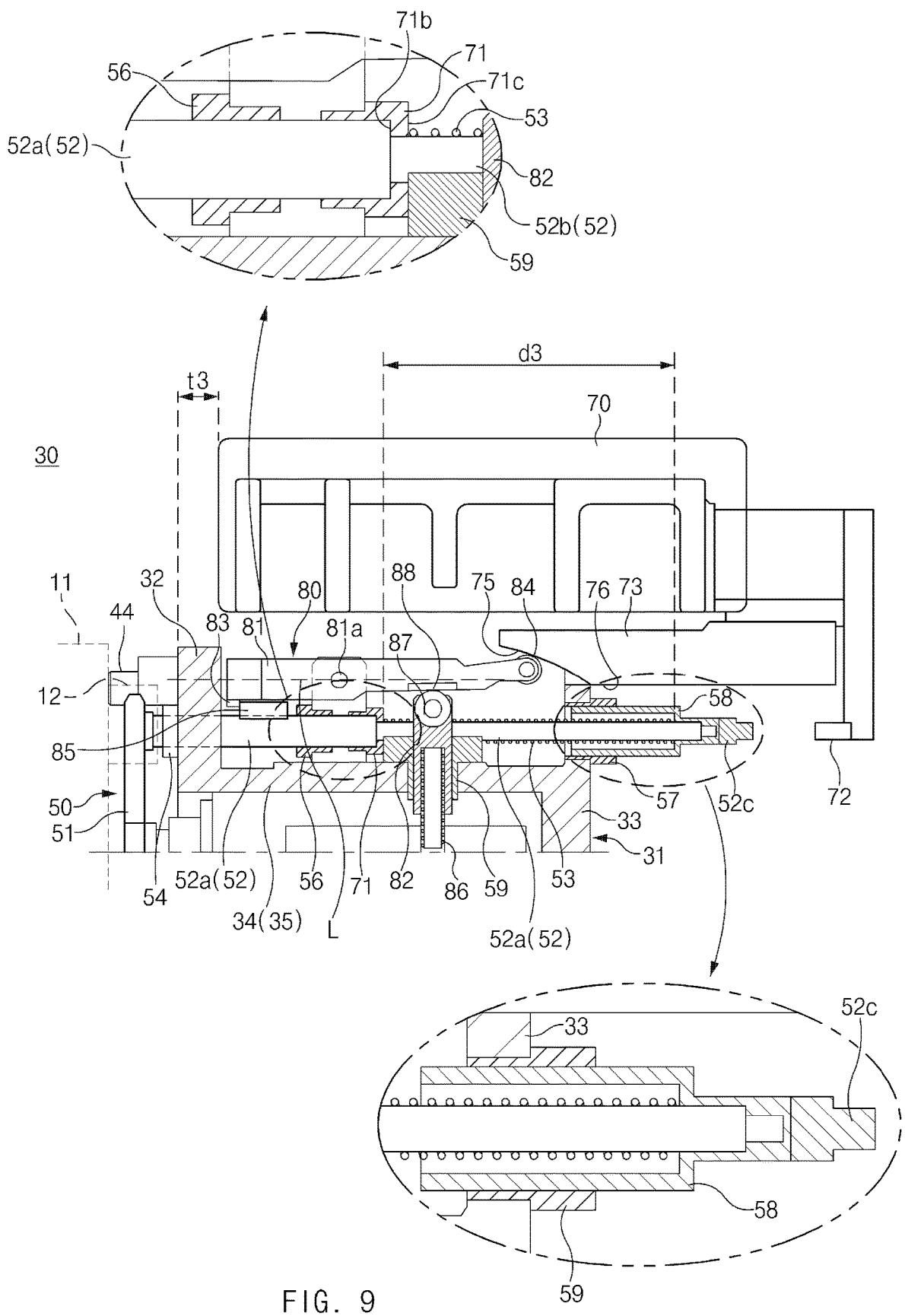
FIG. 9 illustrates a plan cross-sectional view of half of a clamping mechanism according to one aspect of the present disclosure, in a state in which a toolhead is clamped by the clamping mechanism.

The first stopper 71 may be mounted on the rear of the support bracket 55, and the first stopper 71 may have a cavity 71a, such that the rear end of the first rod 52a may move into or move out of the cavity 71a of the first stopper 71. The first stopper 71 may have a first surface 71b limiting a forward position of the housing 31, and a second surface 71c supporting a front end of the first elastic member 53. The first surface 71b may be positioned in the cavity 71a, and the second surface 71c may be positioned opposite to the first surface 71b. As illustrated in FIGS. 8 and 9, when the housing 31 moves forward, the rear end of the first rod 52a may contact the first surface 71b of the first stopper 71 such that the forward position of the housing 31 may be limited. As illustrated in FIG. 7, when the housing 31 moves backward, the rear end of the first rod 52a may be spaced apart from the first surface 71b of the first stopper 71.

The second stopper 72 may be spaced apart from the rear end of the second rod 52b by a predetermined gap. A pair of fixing frames 70 may be fixed to the exterior of the housing 31, and the second stopper 72 may be coupled to each fixing frame 70. As illustrated in FIG. 7, when the housing 31 moves backward, the block 52c disposed on the rear end of the second rod 52b may contact the second stopper 72 such that a reverse position of the housing 31 may be limited.

According to one apsect of the present disclosure, the first elastic member 53 may be disposed in a longitudinal direction of the second rod 52b, and may be a compression spring disposed around the second rod 52b. The first elastic member 53 may be disposed between the second surface 71c of the first stopper 71 and the retainer 58.

As illustrated in FIG. 7, when the housing 31 moves backward away from the toolhead 11, a front end of the front wall 32 of the housing 31 may be spaced apart from a front end of the fixing frame 70 by a first distance t1. As the block 52c disposed on the rear end of the second rod 52b contacts the second stopper 72, a distance d1 between the second surface 71c of the first stopper 71 and the retainer 58 may be relatively shortened, and the first elastic member 53 may be compressed along the axis of the second rod 52b. The first elastic member 53 may not apply an elastic force to the retainer 58, and thus the first elastic member 53 may not apply the clamping force to the clamping plate 51. In other words, when the housing 31 moves backward away from the toolhead 11, the clamping force may not be applied to the rod 52 and the clamping plate 51 due to the compression of the first elastic member 53, so that the selected toolhead 11 may be unclamped.

When the housing 31 in the state illustrated in FIG. 7 moves forward to the toolhead 11 by a predetermined distance (approximately 40 mm), the front end of the front wall 32 of the housing 31 may be spaced apart from the front end of the fixing frame 70 by a second distance t2 as illustrated in FIG. 8, and the second distance t2 may be shorter than the first distance t1. As illustrated in FIG. 8, a distance d2 between the second surface 71c of the first stopper 71 and the retainer may be increased relative to the distance d1 in FIG. 7 (d2>d1), and the first elastic member 53 may be partially stretched. Here, the rear end of the first rod 52a may contact the first surface 71b of the first stopper 71 such that the forward position of the housing 31 may be limited.

When the housing 31 in the state illustrated in FIG. 8 moves further forward to the toolhead 11 by a predetermined distance (approximately 60 mm), the front end of the front wall 32 of the housing 31 may be spaced apart from the front end of the fixing frame 70 by a third distance t3 as illustrated in FIG. 9, and the rear end of the second rod 52b may be spaced apart from the second stopper 72, such that the first elastic member 53 may be fully stretched along the axis of the second rod 52b. Thus, a distance d3 between the second surface 71c of the first stopper 71 and the retainer 58 may be increased relative to the distance d2 in FIG. 8 (d3>d2), and the first elastic member 53 may apply the elastic force to the retainer 58 so that the rod 52 and the clamping plate 51 to which the rod 52 is fixed may be pulled backward. Here, by the forward movement of the housing 31, the toolhead 11 may move forward together.

When the housing 31 moves forward to the toolhead 11, the first elastic member 53 may apply the clamping force to the rod 52 and the clamping plate 51 such that the toolhead 11 may be clamped to the clamping plate 51.

The clamping mechanism 50 may further include a backup clamp 80 locking the rod 52 to maintain a state in which the clamping plate 51 clamps the toolhead 11.

The backup clamp 80 may include a pair of swing arms 81 pivotally connected to the pair of support brackets 55, respectively, and a pair of pushers 82 applying a locking force to the pair of swing arms 81 by a second elastic member 86.

The swing arms 81 may be pivotally connected to the support brackets 55 by pivot pins 81a, respectively. The swing arm 81 may move pivotally between a locking position (see "L" in FIG. 9) in which the rod 52 is locked and an unlocking position (see "UL" in FIG. 7) in which the rod 52 is unlocked.

A first locking protrusion 83 may be fixed to a front end of the swing arm 81, and a second locking protrusion 85 may be fixed to an outer surface of the rod 52 (specifically, the outer surface of the first rod 52a). By the pivot of the swing arm 81, the first locking protrusion 83 of the swing arm 81 may be engaged to or disengaged from the second locking protrusion 85 of the first rod 52a. When the swing arm 81 moves to the locking position (see "L" in FIG. 9), the first locking protrusion 83 may be engaged to the second locking protrusion 85 so that the clamping plate 51 and the rod 52 may be locked, and when the swing arm 81 moves to the unlocking position (see "UL" in FIGS. 7 and 8), the first locking protrusion 83 may be disengaged from the second locking protrusion 85 so that the clamping plate 51 and the rod 52 may be unlocked.

A cam roller 84 may be rotatably mounted on the rear end of the swing arm 81, and a cam guide 73 may be mounted on the fixing frame 70. The cam roller 84 may move along the cam guide 73. The cam guide 73 may have a first guide surface 75 allowing the swing arm 81 to move to the locking position when the housing 31 moves forward, and a second guide surface 76 allowing the swing arm 81 to move to the unlocking position when the housing 31 moves backward. The first guide surface 75 may be curved at a predetermined radius, and the second guide surface 76 may be flat in a horizontal direction. The cam guide 73 may guide the movement of the cam roller 84 while the housing 31 is moving, thereby allowing the swing arm 81 to move between the locking position L and the unlocking position UL.

A proximity sensor 89 may be mounted on the rear wall 33 of the housing 31, and the proximity sensor 89 may be disposed adjacent to the cam roller 84. A controller (not shown) may control the proximity sensor 89 to detect the position of the cam roller 84 of the swing arm 81 so that the controller may detect a pivot state of the swing arm 81.

Each pusher 82 may move in a direction perpendicular to the axis of the rod 52 by the elastic force of the second elastic member 86. An axis of the second elastic member 86 may be disposed in the direction perpendicular to the axis of the rod 52. A fourth guide member 59 may be mounted on each of the sidewalls 34 and 35 of the housing 31, and the movement of each pusher 82 may be guided by the fourth guide member 59.

Each pusher 82 may contact a portion of the swing arm 81 (between the pivot pin 81a and the rear end of the swing arm 81). The pusher 82 may push the swing arm 81 by the elastic force of the second elastic member 86 to apply the locking force to the swing arm 81 so that the first locking protrusion 83 of the swing arm 81 may be engaged to the second locking protrusion 85 of the first rod 52a, and the clamping plate 51 and the rod 52 may be locked.

Each pusher 82 may have a roller 87 rotatably mounted on the end thereof, and the roller 87 of the pusher 82 may be in rolling contact with the swing arm 81. The swing arm 81 may have an anti-wear member 88 fixed to a portion of the swing arm 81 contacting the roller 87. The anti-wear member 88 may be formed of an anti-wear material. The roller 87 and the anti-wear member 88 may reduce friction between the pusher 82 and the swing arm 81.

According to one form, the second elastic member 86 may include a single compression spring disposed between the pair of pushers 82 such that the second elastic member 86 may be disposed to traverse between the sidewalls 34 and 35 of the housing 31. According to another form, the second elastic member 86 may include a pair of compression springs elastically supporting the respective pushers 82.

As illustrated in FIG. 7, when the housing 31 moves backward away from the toolhead 11, the front end of the housing 31 and the front end of the fixing frame 70 may be spaced apart from each other by the first distance t1, and the front end of the housing 31 may be in a rearward position relative to the front end of the fixing frame 70. The cam roller 84 of the swing arm 81 may be guided along the second guide surface 76 of the cam guide 73 so that the swing arm 81 may move to the unlocking position UL. As the swing arm 81 moves to the unlocking position UL, the swing arm 81 may push the pair of pushers 82 such that a distance between the pair of pushers 82 may be relatively reduced, and thus the second elastic member 86 may be compressed. When the swing arm 81 moves to the unlocking position UL, the first locking protrusion 83 may be disengaged from the second locking protrusion 85 so that the rod 52 may be unlocked.

When the housing 31 in the state illustrated in FIG. 7 moves forward to the toolhead 11 by a predetermined distance (for example, approximately 40 mm), the front end of the front wall 32 of the housing 31 and the front end of the fixing frame 70 may be spaced apart from each other by the second distance t2 in FIG. 8, and the front end of the housing 31 may be in a rearward position relative to the front end of the fixing frame 70. The second distance t2 may be shorter than the first distance t1. As illustrated in FIG. 8, the cam roller 84 of the swing arm 81 may move forward along the second guide surface 76 of the cam guide 73 to be guided to a point where the first guide surface 75 and the second guide surface 76 meets. The cam roller 84 may start to enter the first guide surface 75.

Thereafter, when the housing 31 in the state illustrated in FIG. 8 moves further forward to the toolhead 11 by a predetermined distance (for example, approximately 60 mm), the front end of the housing 31 may be in a forward position relative to the front end of the fixing frame 70, and the front end of the housing 31 and the front end of the fixing frame 70 may be spaced apart from each other by the third distance t3. As illustrated in FIG. 9, the cam roller 84 of the swing arm 81 may be guided along the first guide surface 75 of the cam guide 73 so that the swing arm 81 may move to the locking position L. As the swing arm 81 moves to the locking position L, each pusher 82 may protrude from the fourth guide member 59 such that a distance between the pair of pushers 82 may be relatively increased, and the second elastic member 86 may be stretched. The elastic force of the second elastic member 86 may be transmitted to the swing arm 81 through the pusher 82 so that the first locking protrusion 83 of the swing arm 81 may be engaged to the second locking protrusion 85 of the first rod 52a, and the rod 52 may be locked. By locking the rod 52, the rod 52 and the clamping plate 51 may more firmly clamp the toolhead 11 without shaking.

The drive mechanism 60 may be mounted in the first space 36 of the housing 31, and the clamping mechanism 50 may be mounted in the pair of second spaces 37 and 38. The drive mechanism 60 may be configured to drive the tool spindle 15 of the toolhead 11 clamped by the clamping mechanism 50. The drive mechanism 60 may include a drive motor 61, a drive shaft 62 detachably connected to the tool spindle 15 of the toolhead 11 through a coupler 65, and a gear train 63 transmitting power of the drive motor 61 to the drive shaft 62. The gear train 63 may include a first gear 63a connected to the output of the drive motor 61, a second gear 63b meshing with the first gear 63a, a third gear 63c connected to the second gear 63b through an intermediate shaft 63e, and a fourth gear 63d meshing with the third gear 63c.

The axis X1 of the shaft 23 may be parallel to an axis X2 of the drive shaft 62. The axis of rotation of the toolhead changer 20 may be parallel to the axis of rotation of the drive mechanism 60, and thus the inventive structure may be more compact, compared to a corresponding structure according to the related art.

Figure 10:
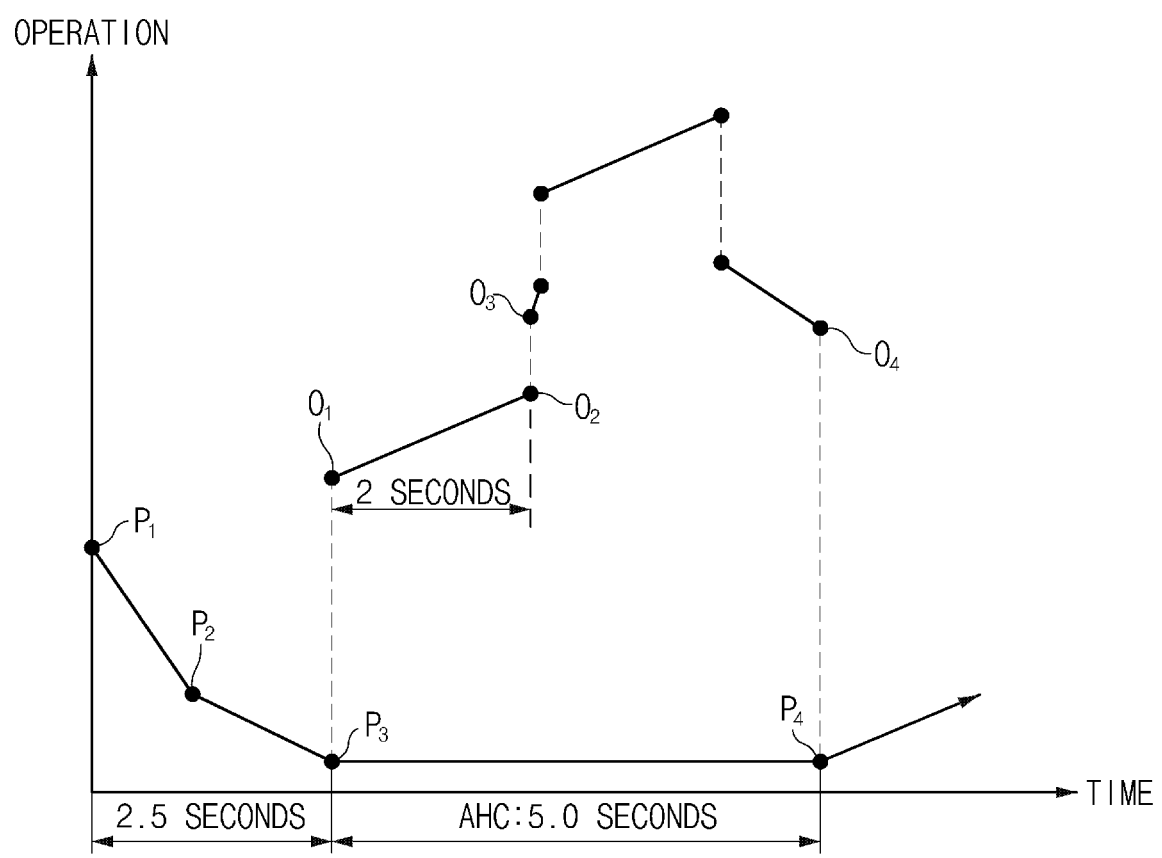
FIG. 10 illustrates a graph of a toolhead change cycle of a machining center according to the related art.

FIG. 10 illustrates a graph of a toolhead change cycle of a machining center according to the related art.

Referring to FIG. 10, in the machining center according to the related art, when a machining process of a toolhead clamped by a hydraulic clamping mechanism is finished ($P_1$), the toolhead may be moved back to a first reverse position ($P_1$-$P_2$) by a feed unit, and then the toolhead may be moved back to a second reverse position ($P_2$-$P_3$) for change by the feed unit. The hydraulic clamping mechanism may unclamp the clamped toolhead ($O_1$-$O_2$). Thereafter, the toolhead may be changed to another toolhead by a toolhead changer ($O_3$-$O_4$).

The machining center according to the related art may take approximately two seconds for the hydraulic clamping mechanism to unclamp the toolhead ($O_1$-$O_2$). For example, an unclamping operation time of the hydraulic clamping mechanism may take up approximately two seconds as an operation signal of a solenoid valve, a hydraulic fluid supply time, a safety delay time, and the like are applied in a complex and sequential manner. Thus, it may take up approximately five seconds to change the toolhead ($O_1$-$O_4$). As described above, the machining center according to the related art may involve a relatively long toolhead change time due to the hydraulic clamping mechanism.

Figure 11:
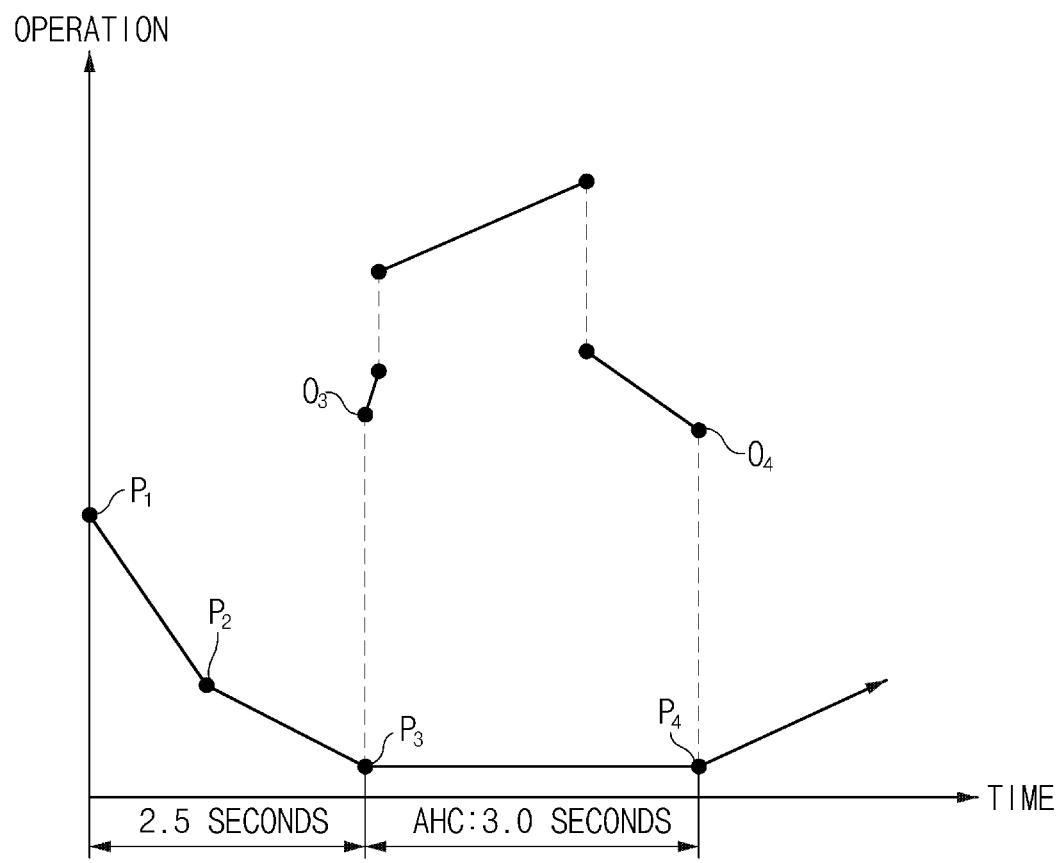
FIG. 11 illustrates a graph of a toolhead change cycle of a machining center according to one aspect of the present disclosure.

FIG. 11 illustrates a graph of a toolhead change cycle of a machining center according to one aspect of the present disclosure.

Referring to FIG. 11, in the machining center according to one aspect of the present disclosure, when a machining process of the toolhead 11 clamped by the clamping mechanism 50 is finished ($P_1$), the toolhead 11 may be moved back to a first reverse position ($P_1$-$P_2$) by the feed unit 40, and then the toolhead 11 may be moved back to a second reverse position ($P_2$-$P_3$) for change. Thereafter, the toolhead 11 may be changed to another toolhead by the toolhead changer 20 ($O_3$-$O_4$). The machining center according to one form of the present disclosure may be configured to mechanically clamp and unclamp the toolhead 11 simultaneously with the movement of the clamping mechanism 50 by the feed unit 40, thereby involving a relatively short time of clamping and unclamping the toolhead 11. Thus, a toolhead change time ($O_3$-$O_4$) may be approximately three seconds. As described above, as the machining center according to one aspect of the present disclosure may involve a relatively short clamping and unclamping time, the toolhead change time may be relatively shortened.

According to one form of the present disclosure, the clamping mechanism 50 is not limited to clamping only the toolhead 11 of the machining center 10 as described above, but may also be used for clamping various objects such as a workpiece and a jig. The object may have a plurality of clamping blocks for receiving the edges of the clamping plate 51.

As set forth above, the clamping mechanism according to various forms of the present disclosure can clamp or unclamp objects quickly and accurately, thereby reducing the change time of objects and improving the overall work efficiency.

Although the present disclosure has been described with reference to various aspects and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A clamping mechanism, comprising:
   a housing which is movable to clamp or unclamp an object having clamping blocks;
   a clamping plate disposed in front of the housing;
   a rod configured to guide the movement of the housing and fastened to the clamping plate; and
   a first elastic member applying a clamping force to the clamping plate by movement of the housing; and
   a backup clamp locking the rod to maintain a state in which the clamping plate clamps the object,
   wherein the clamping blocks have receiving grooves in which edges of the clamping plate are received, and
   wherein the backup clamp includes a swing arm pivotally connected to the housing, and a pusher applying a locking force to the swing arm by a second elastic member.

2. The clamping mechanism according to claim 1, wherein the rod includes a first rod and a second rod,
   the first rod is fastened to a rear surface of the clamping plate,
   the second rod is fastened to a rear end of the first rod, and
   a diameter of the first rod is greater than a diameter of the second rod.

3. The clamping mechanism according to claim 2, wherein the first elastic member is disposed in a longitudinal direction of the second rod, and is a compression spring disposed around the second rod.

4. The clamping mechanism according to claim 3, wherein a moving distance of the housing is limited by a first stopper and a second stopper.

5. The clamping mechanism according to claim 4, wherein the first stopper limits a forward position of the housing, and
   the second stopper limits a reverse position of the housing.

6. The clamping mechanism according to claim 4, wherein the first stopper has a first surface limiting a forward position of the housing, and a second surface supporting a front end of the first elastic member.

7. The clamping mechanism according to claim 6, wherein the second rod has a retainer supporting a rear end of the first elastic member.

8. The clamping mechanism according to claim 4, wherein the second stopper is spaced apart from a rear end of the second rod by a predetermined gap.

9. The clamping mechanism according to claim 1, wherein the swing arm moves between a locking position in which the rod is locked and an unlocking position in which the rod is unlocked.

10. The clamping mechanism according to claim 9, wherein the backup clamp further includes a first locking protrusion fixed to a front end of the swing arm and a second locking protrusion fixed to an outer surface of the rod,
    the locking position is a position in which the first locking protrusion is engaged to the second locking protrusion, and
    the unlocking position is a position in which the first locking protrusion is disengaged from the second locking protrusion.

11. The clamping mechanism according to claim 9, wherein the backup clamp further includes a cam roller rotatably mounted on a rear end of the swing arm, and a cam guide guiding a movement of the cam roller, and
    the cam guide has a first guide surface allowing the swing arm to move to the locking position, and a second guide surface allowing the swing arm to move to the unlocking position.

12. The clamping mechanism according to claim 1, wherein the pusher moves in a direction perpendicular to an axis of the rod by the second elastic member.

13. The clamping mechanism according to claim 12, wherein the pusher contacts the swing arm, and pushes the swing arm by an elastic force of the second elastic member to apply the locking force to the swing arm.

14. The clamping mechanism according to claim 12, wherein the pusher has a roller rotatably mounted on an end thereof, and
    the swing arm has an anti-wear member fixed to a portion thereof contacting the roller.

15. A machining center, comprising:
    a toolhead changer including a turret having a rotating shaft, and a motor rotating the rotating shaft of the turret;
    a plurality of toolheads disposed along a circumference of the turret; and
    a machine tool including a clamping mechanism clamping a toolhead selected by the toolhead changer, and a drive mechanism driving a tool spindle of the toolhead clamped by the clamping mechanism,
    wherein the clamping mechanism includes:
    a housing which is movable to clamp or unclamp the toolhead selected by the toolhead changer;
    a clamping plate disposed in front of the housing;
    a rod configured to guide the movement of the housing and fastened to the clamping plate;
    a first elastic member applying a clamping force to the clamping plate by movement of the housing; and
    a backup clamp locking the rod to maintain a state in which the clamping plate clamps the toolhead,
    wherein:
    each toolhead has clamping blocks fixed to a rear surface thereof,
    the clamping blocks have receiving grooves in which at least portions of edges of the clamping plate are received, and
    the backup clamp includes a swing arm pivotally connected to the housing, and a pusher configured to apply a locking force to the swing arm by a second elastic member.

* * * * *